US012723541B1

(12) United States Patent
Woodall

(10) Patent No.: US 12,723,541 B1
(45) Date of Patent: Sep. 1, 2026

(54) CONVERTING INTERMITTENT SOLAR AND WIND PRODUCED ELECTRICITY TO 24/7 GRID ELECTRICITY VIA ON-DEMAND ALUMINUM ENERGY STORAGE AND ITS CONVERSION BACK TO ECONOMICALLY COMPETITIVE 24/7 LOCAL GRID ELECTRICITY

(71) Applicant: Jerry M. Woodall, Davis, CA (US)

(72) Inventor: Jerry M. Woodall, Davis, CA (US)

( * ) Notice: Subject to any disclaimer, the term of this patent is extended or adjusted under 35 U.S.C. 154(b) by 0 days.

(21) Appl. No.: 18/978,670

(22) Filed: Dec. 12, 2024

(51) Int. Cl.
*F02C 6/00* (2006.01)
*C01B 3/08* (2006.01)
*H02S 10/20* (2014.01)
*C22B 21/00* (2006.01)

(52) U.S. Cl.
CPC .................. *F02C 6/00* (2013.01); *C01B 3/08* (2013.01); *H02S 10/20* (2014.12); *C22B 21/0084* (2013.01); *F05D 2220/70* (2013.01)

(58) Field of Classification Search
CPC ... F02C 6/00; F02C 6/14; H02S 10/20; C01B 3/08; C22B 21/0084; F05D 2220/74; F05D 2220/76; F01K 23/10; H01M 8/065; Y02E 60/36; Y02E 60/50; C25B 1/04
See application file for complete search history.

(56) References Cited

U.S. PATENT DOCUMENTS

| | | | | |
|---|---|---|---|---|
| 4,358,291 | A | 11/1982 | Cuomo et al. | |
| 7,233,079 | B1 * | 6/2007 | Cooper | H02J 3/381 290/55 |
| 8,080,233 | B2 * | 12/2011 | Woodall | C10L 5/00 502/355 |
| 10,415,147 | B2 * | 9/2019 | Liu | C25C 7/007 |
| 2010/0028255 | A1 * | 2/2010 | Hatoum | C01B 13/0214 423/657 |
| 2011/0084487 | A1 * | 4/2011 | Davidson | H01M 8/065 60/39.12 |
| 2014/0154173 | A1 * | 6/2014 | Phillips | H01M 8/0656 422/186.04 |

* cited by examiner

*Primary Examiner* — Loren C Edwards
(74) *Attorney, Agent, or Firm* — Heisler & Associates

(57) ABSTRACT

The invention proposes using aluminum as a green inert energy storage media in combination with two coupled closed loop components. One loop is the water splitting reactor to release truly green electricity via a water splitting reaction that produces green hydrogen, green heat, and green aluminum oxide. Green power sources such as photovoltaic arrays are used to power the second closed loop component, a green smelter which cyclically converts the aluminum oxide reactant back to green aluminum. Green electricity is put out to the grid from a green hot gas generator utility which relies on green hot gases supplied by combusting the green hydrogen produced by the water splitting reaction along with heat evolved from the water splitting reaction.

10 Claims, 2 Drawing Sheets

CONVERTING INTERMITTENT SOLAR AND WIND PRODUCED ELECTRICITY TO 24/7 GRID ELECTRICITY VIA ON-DEMAND ALUMINUM ENERGY STORAGE AND ITS CONVERSION BACK TO ECONOMICALLY COMPETITIVE 24/7 LOCAL GRID ELECTRICITY

CROSS-REFERENCE TO RELATED APPLICATIONS

Not Applicable.

BACKGROUND AND PRIOR ART

Expired U.S. Pat. No. 4,358,291, teaches that "Aluminum (Al) is hydrolyzed in the presence of gallium (Ga) producing aluminum oxide, heat, and hydrogen. The aluminum oxide is in turn electrolyzed back to aluminum. The basic science of this invention is the recognition that elemental Al is inert with respect to reacting with water owing to its passivating oxide that prevents the reaction with water. This is also called a "water splitting" reaction. By dissolving Al into liquid Ga, the Al atoms in the liquid Ga are no longer protected against oxidation.

The three sub-reactions which comprise the entire water splitting reaction are:

(Eq.1)

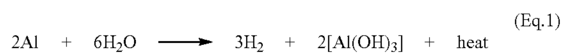

(Eq. 2)

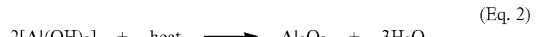

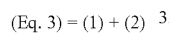

(Eq. 3) = (1) + (2)

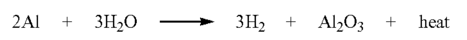

$Al(OH)_3$ is known as aluminum tri-hydroxide and as the mineral "gibbsite". When $Al(OH)_3$ (also written as $Al_2O_3 \cdot H_2O$) is heated (calcined) its water is separated from the gibbsite which produces $Al_2O_3$, known as alumina, and also known as the mineral corundum.

It is well known that electricity produced by both photovoltaics (PVs), AKA solar cells, and wind turbines (WTs) are both intermittent sources of "green electricity." Specifically, this is electricity that does not produce a green-house gas footprint, (e.g. $CO_2$), which has been deemed a culprit in climate change, a phenomenon which is claimed to result in increased temperatures and extreme weather patterns around the world. In response to climate change there is currently a global scale effort to electrify all the energy needed to operate the planet by producing green electricity.

PV and WT industries are rapidly maturing to the point where they are approaching parity with the cost of using fossil fuels to produce centralized utility electricity. Furthermore, as of 2023 the worldwide (WW) power capacity of installed PVs is 1.06 terawatts (TW). The average WW per-day solar insolation is about a 5-hour period. Thus, the WW per-day energy produced is 5.35 terawatt hours (TWh). The WW average daily electricity consumption is 55 TWh per day. Therefore, solar production is currently at about 10% of the needed WW daily consumption. As of 2023, the WW installed power capacity of WT produced electricity is only 0.001 TW per day. So, at this time, WT is negligible as a global green electricity power source.

While solar is gaining ground, building out more PV arrays by a factor of 10 will not solve the real issue: the need to store almost 5 times (24 hr/day)/(5 hr-sunlight/day) the amount of energy produced during daylight hours to eliminate the need for producing electricity from fossil fuels at night. Simply put, the sun always sets, leaving a dark world which must presently depend on fossil fuel electricity production to get through the night.

With PV and WT power being intermittent these power generation technologies need an economically and environmentally friendly global scale energy storage technology for conversion of intermittent green power into on-demand energy storage; and the conversion of the stored energy back into 24/7 electricity. Currently, the most significant technology for this needed energy are batteries. As of 2023 the WW energy storage capacity is only 0.028 TWh. Re-examining the current daily WW electricity consumption of 55 TWh, it is clear that at the very least, for a storage technology to be viable it will need to be recyclable and store about 80% of the 55 TWh to be available during periods of darkness and doldrums. (Since the current WW contribution of WT power is insignificant it will not be considered here.) When days are "dark" the needed storage could be as high as 85%. Using 80% of the amount of daily use, the recharge storage would be 44 TWh. Currently, there is only $(0.028/44) \times 100 = 0.0064\%$ WW battery storage capacity which is clearly insufficient for the world's needs. If batteries are to be used, an increase by a factor of nearly 1600 (e.g. (0.8)(55/0.028)) of battery storage will be needed compared to the present day.

Furthermore, as an energy storage media, batteries eventually lose their storage capacity and must be replaced from time to time. Upon replacement, the old, caustic, batteries must be disposed of or recycled. Therefore, while PV and WT energy is green electricity the disposal of battery storage media is anything but green, presenting an environmental problem.

The purpose of this patent is to disclose an integrated system that will convert low-cost intermittent PV and WT produced electricity to 24/7 power using an on-demand aluminum energy storage media and convert the energy stored in the media back to economically competitive 24/7 local grid electricity and the production of low-cost green hydrogen.

SUMMARY OF THE INVENTION

The invention proposes using aluminum as an electricity storage media in combination with a closed loop water splitting reactor to store and release truly green electricity and hydrogen generated from PV and WT sources. This invention has two parts:

First, this invention is using aluminum, or other green recyclable materials as an energy storage media wherein energy is stored from low-cost green electricity generated by solar cells, wind turbines or other sources of green electricity produced by non-fossil fuels. It is predicated on a daily use of the sun to produce solar-derived energy to produce a desired electricity output on a 24/7 basis.

Second, another key feature of this invention is the use of two rapid cyclic operations. First, there is the rapid-cycle reactor that sends gallium activated aluminum in a loop through water that produces heat, hydrogen, and gibbsite. The heat and the hydrogen is combusted and sent to an efficient turbine to generate the output electricity. The water generated from the combusted hydrogen is collected and returned to the reactor. The second cyclic operation is sending the gibbsite to the aluminum smelter(s). The smelter reduces the gibbsite back to aluminum. During smelting, the water from the gibbsite (Eq. 2) and from the gibbsite heat decomposition chemistry is collected and returned to the reactor. Since this is a closed loop system the recapture of water is extremely high and as a result "new" water input from external sources is relatively low, thus placing very little stress on municipal water systems from the community where the reactor is located.

For some applications, magnesium (Mg) can be substituted for aluminum as the energy storage material. For this invention aluminum is produced from an aluminum oxide source that is smelted to aluminum via electricity produced by PVs or WTs. The input source of the aluminum oxide is a reactant from the overall reaction (Eq. 1). Aluminum mixed with liquid gallium becomes "gallum", a term that will be used further in this disclosure. Gallum splits water into hydrogen, heat and gibbsite, a hydrated species of alumina. Because aluminum is a safe, abundant, cheap and recyclable energy storage material, it has many advantages when compared to the other storage systems being developed, (e.g., hydrogen). The output is hydrogen directly to an application, such as a fuel cell, or hydrogen burned directly in a high-efficiency hot gas generator which generates electricity to a local grid system. During the water-splitting reaction heat is generated and adds to the heat from burning hydrogen (also produced during water-splitting) in the hot gas generator.

The purpose of the fast-recycling operations is to reduce the inventory of aluminum and gallium required to be stored onsite. Negligible aluminum and gallium are lost to these closed loop reactions. For a 30-megawatt power plant, a working inventory of 162 metric tons (tonnes) of aluminum and 1 tonne of gallium are required. The per annum lost amounts of aluminum and gallium are estimated to be 1.6 tonnes of aluminum and 10 kg of gallium, respectively.

The invention proposes using an Elysis smelter which smelts gibbsite back to aluminum through a green process using non-carbon electrodes. In this way, the smelting process along with the other components of the invention (water splitting process, use of PV and WT clean energy) are entirely free of any carbon footprint and can legitimately be called a one hundred percent "green" energy process.

DETAILED DESCRIPTION OF THE PREFERRED EMBODIMENTS

While WT may be substituted for PV herein, due to the small contribution of WT to global green energy at present, this description will use PV as an example of accomplishing the invention due to its significantly higher contribution to green energy at present. Also, it is envisioned that the invention will be sited at multiple locations worldwide where it is possible to place large PV arrays.

At present, PV panels are 20 percent efficient, but efficiency could increase depending on future technological advances. At that future time, the size of the PV arrays and amount of land needed to site them could be decreased, if desired.

Another factor is the 50 percent estimated efficiency of hot gas electricity power plant generators which will be injected with heat from the burning of $H_2$ gas and heat generated by the water-splitting reaction detailed previously herein. In the example described, the electrical power plant will be of 30 MW plant size, wherein the daily electrical energy production is 30 MW×24 hours=720 MW hours per day (MWh/day). Due to the present 50 percent efficiency of hot gas generators, the water splitting technology would have to produce 1440 MWh/day to deliver a 720 MWh/day production of electricity out to the grid.

Figure 1:
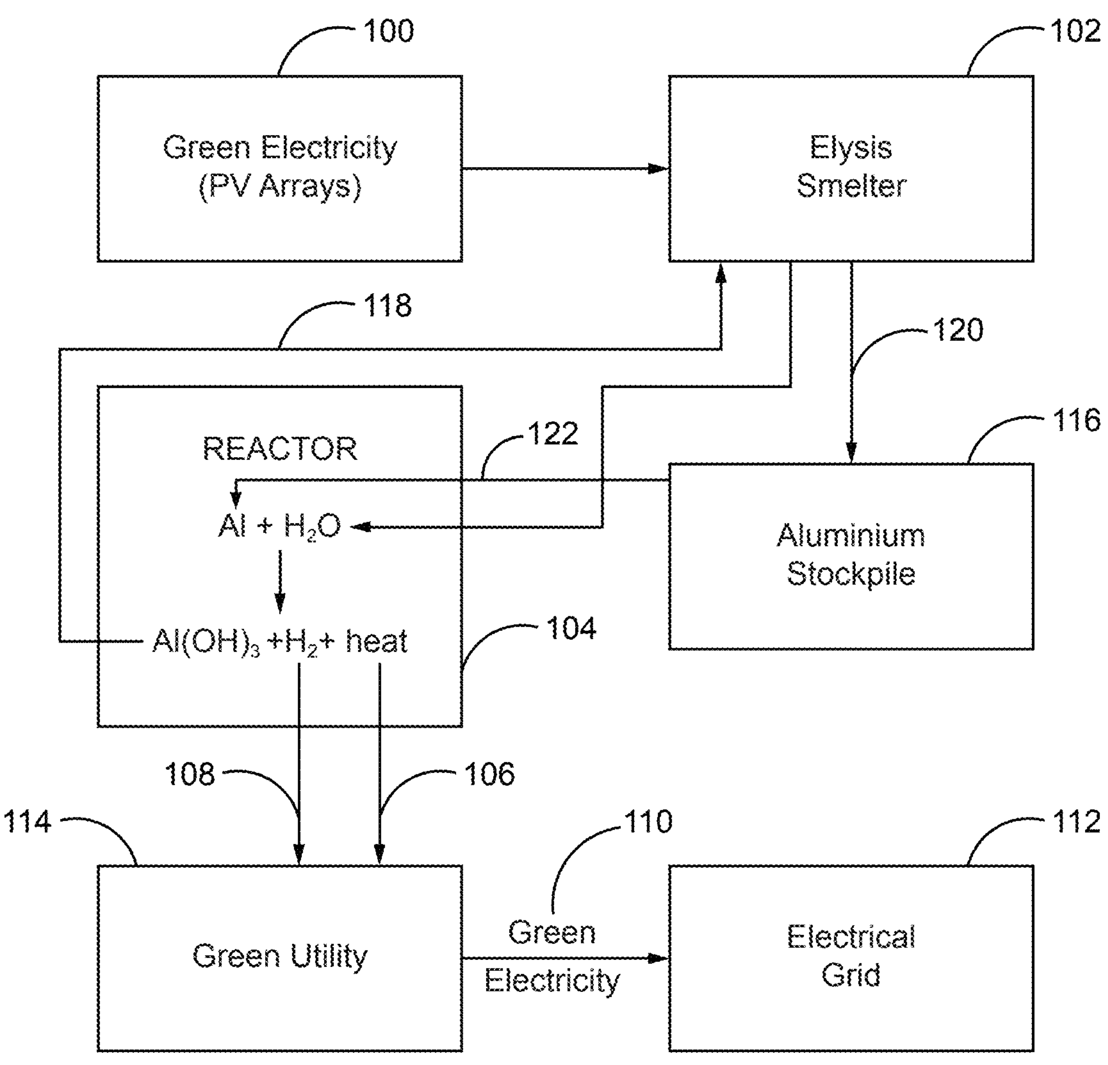
FIG. 1 is a schematic of the required elements of the invention, including a PV array which powers an Elysis smelter, a water splitting reactor, a hot gas reactor electric utility and infrastructure for putting electricity out to the grid.

Referring to FIG. 1, green electricity is produced by a large PV array 100 to power an Elysis type smelter 102. The disadvantage of sending power generated by the PV array directly to the grid has already been detailed herein, namely that energy production ceases when the sun goes down. The invention instead uses the PV array 100 to power an Elysis type smelter 102, which produces a 24/7 available Al energy storage stockpile 116 in conjunction with a water splitting reactor 104 that produces heat 106, $H_2$ gas 108, and gibbsite 118 on a 24-hour basis, thus obviating the problem of PV arrays only producing electricity for 5+ hours per day.

The PV Array

To put 720 MWh/day of green electricity 110 production out to the grid 112 requires that the PV array 100 produce at least 2,296 MWh/d of PV electricity into the Elysis smelter 102. At current panel efficiency of 20 percent, one square kilometer ($km^2$) of land covered in PV arrays would produce 1,000 MWh of electricity/day. Therefore, to produce 720 MWh/d green electricity 110 to the grid 112 from the green utility 114 would require about 2.5 $km^2$ of land covered by PV arrays to produce 2,500 MWh to accommodate the 2,296 MWh/d of PV green electricity 100 required to drive the smelter. Reduced to acres, about 620 acres of flat land would be required to contain the requisite PV array for purposes of the invention. For areas that are vulnerable to long periods of inclement/cloudy weather the PV land area may need to be adjusted upward. For example, a PV array can be easily scaled up to accommodate 3000 MWh/d PV arrays.

The Aluminum Stockpile

Still referring to FIG. 1, aluminum stockpile 116 remains on the power plant site to provide an energy storage medium that is available to be accessed on demand for supplying the water splitting reaction in the reactor 104. The water splitting reaction creates heat 106 and $H_2$ gas 108 on a 24-hour basis for the hot gas generator in the electrical utility. When the water splitting reaction is completed the gibbsite 118 is sent back to the Elysis smelter 102 which drives the water splitting reaction in reverse to produce aluminum 120 which is then sent back to the stockpile 116. To produce the 720 MWh/day of electricity into the grid 112 from the electrical utility 114, requires the input of 164 tonnes of aluminum per day 122 into the reactor 104, where one tonne=1000 kg. The aluminum stockpile 116 on-site is kept at an inventory of 600 tonnes to constantly supply the 164 tonnes required to make electricity and to add to any minimal losses of aluminum over time.

The Reactor

In FIG. 1, reactor 104 contains the water splitting reaction in a closed loop to produce heat 106 and $H_2$ gas 108 on a 24-hour basis. Ultimately, the gas generator in the electrical utility is 50 percent efficient, so to make the required 720 MWh/d, 1440 MWh/d of heat 106 and $H_2$ gas 108 must be generated in the reactor.

The energy released when 1 kg of aluminum is split releases 8.8 kWh/kg, so that splitting a tonne of aluminum releases 8.8 MWh/tonne. Therefore, the amount of aluminum needed to produce 720 MWh/day of electricity to the grid is (1,440 MWh/day)/(8.8 MWh/day)/tonne-Al)=164 tonnes Al/d. This amount must be reacted on a 24-hour basis.

The reactor will complete the reaction of the 164 tonnes of Al/day in 15-minute fractional cycles throughout a 24-hour day. Since there are 24 hours/day×60 min./h=1440 min./day. There will be (1440 min./day)/(15 min./cycle)=96 reactor cycles/d. Each cycle will process (164 tonnes-Al/day)/(96 reactor cycles/day)=1.7 tonnes Al/cycle.

At the end of the water splitting cycle, in addition to heat 106 and $H_2$ gas 108, gibbsite (e.g. $Al(OH)_3$) 118 is produced, this gibbsite being fodder for the Elysis smelter 102 which drives the water splitting reaction in reverse to produce aluminum 120.

Figure 2:
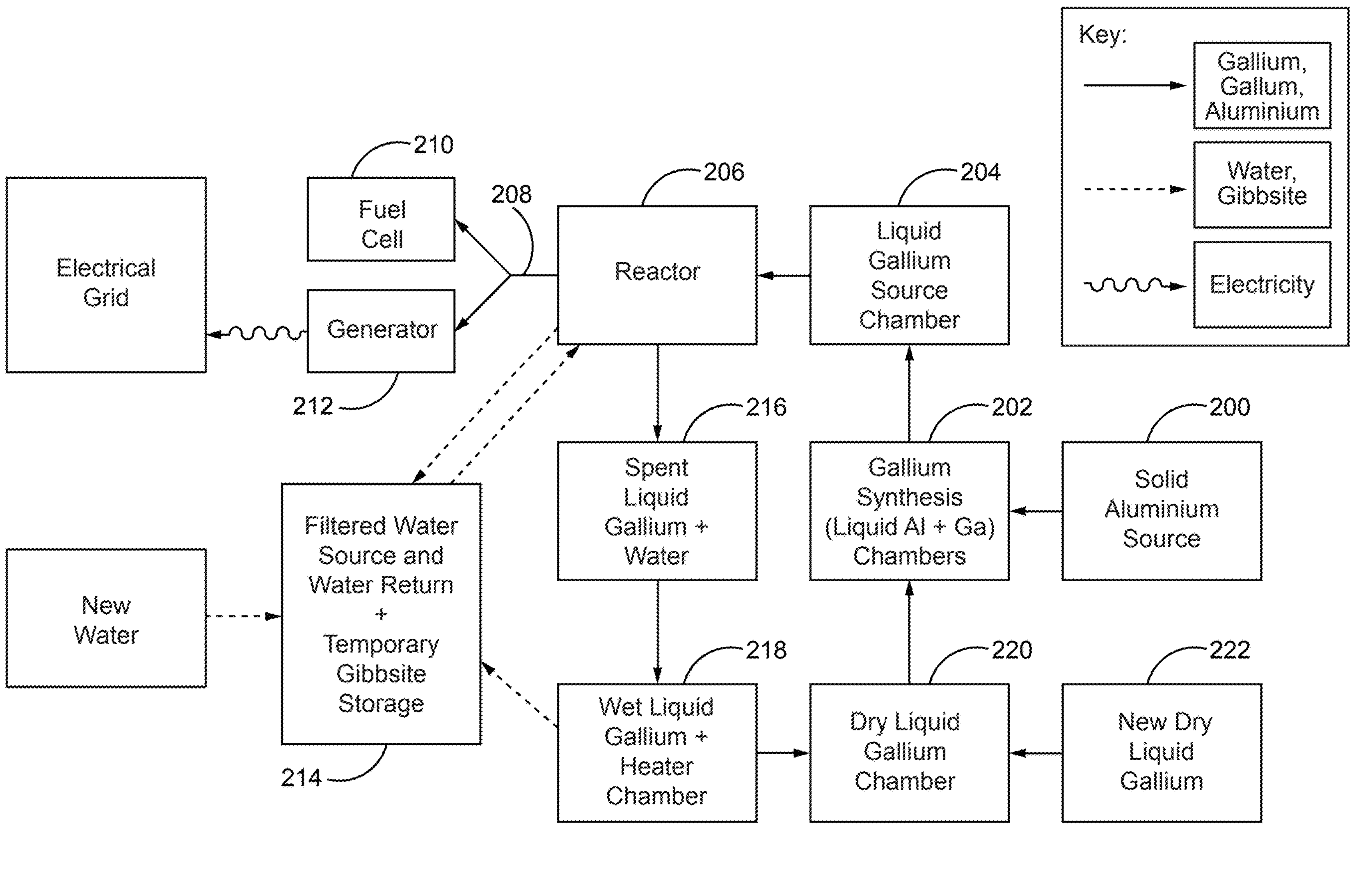
FIG. 2 is a schematic of the water splitting reactor component of the invention.

More specific details of the operation of a reactor fractionally processing 1.7 tonnes aluminum per 15-minute cycle is shown in FIG. 2. The reaction will be carried out at 300 C where the solubility of aluminum in liquid gallium is 15 wt %. To process 1.7 tonnes aluminum per 15-minute cycle requires 9.6 tonnes of gallium. (e.g. (1.7 tonnes Al)/(9.6 tonnes Ga+1.7 tonnes Al)=0.15. Since gallium is inert and never leaves the site, whatever amount gets absorbed by the gibbsite reaction product gets recycled back during the aluminum smelting operation.

Referring to FIG. 2, the process starts with the insertion of the solid aluminum source 200 into the gallum synthesis chamber 202. This is where the aluminum source dissolves into the liquid gallium and becomes liquid gallum, (a liquid mixture of gallium and aluminum), the activated element component of the invention. Next, a pre-determined amount of the synthesized gallum is transferred to liquid gallum source chamber 204. From here the liquid gallum is transferred to reactor 206 which is pre-charged with water that will be split by the aluminum component in the gallum. Once in reactor 206 the following chemical reaction will occur:

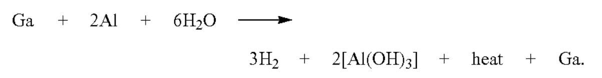

The generated $H_2$ 208 is fed into a fuel cell 210 to produce electricity or combusted into steam and combined with the reaction heat and channeled directly to the gas turbine electricity generator 212 or stored in buffer tanks (not shown) for on-demand use. The hot water and the gibbsite in the reactor are transferred via flowing the hot reactor water (see broken lines) with suspended gibbsite particles to and from the reactor 206 and a large water/gibbsite powder storage tank 214 with internal heat exchangers.

Once the liquid gallum is depleted of aluminum it becomes liquid gallium and is transferred to the spent liquid gallium and water chamber 216. Here, most of the remaining water from the reactor is transferred to the large water/gibbsite slurry storage tank (not shown), leaving behind wet gallium.

Next the wet liquid gallium is transferred to the wet liquid gallium and heater chamber 218 where it is dried of water and the water is collected and returned to either the reactor or water/gibbsite storage tank.

Next the dried liquid gallium is transferred to the dry liquid gallium chamber 220 where it will receive new dry liquid gallium 222 to replace any gallium that was stuck to the Gibbsite (which can happen).

The reaction cycle is completed when the dried liquid gallium is transferred to gallum synthesis chamber 202.

The Elysis Smelter

The Elysis smelter employed for purposes of this invention is produced by Rio Tinto, Inc. The Elysis smelter drives the water splitting reaction in reverse, using gibbsite produced by the reactor as starting material. Smelting and reaction do not have to be time correlated or sequenced. The Elysis smelter was chosen as a component of this invention due to its green construction which uses non-carbon-based electrodes to avoid introducing carbon into any step in the invention. By using non-carbon electrodes, no "dirty" aluminum is produced when the gibbsite is smelted back to aluminum.

To smelt gibbsite to aluminum requires 14 MWh/tonne-Al. Therefore, it will take (164 tonnes-Al)(14 MWh/tonne-Al)=2,300 MWh of electricity/day. As shown previously herein, the PV array that will be established will provide a daily electrical energy of 2,500 MWh/day. For areas that are vulnerable to long periods of inclement/cloudy weather the PV land area may need to accommodate 3,000 MWh/day PV arrays.

On average the sun only effectively drives PV systems for 5 hours each day and the PV array of this example provides 2,500 MWh/day. Smelting 164 tonnes of aluminum, that has become gibbsite, back to aluminum requires 2,300 MWh of PV electricity. During darkness or wind doldrums the empty smelter must remain at 600 C to prevent the ceramic tiles in the smelter from cracking. The heat needed for this would come from burning stored hydrogen or via a latent heat battery. Since the density of aluminum is 2.7 tonnes/$m^3$, the volume of the required single smelter=(164 tonnes-Al)/(2.7 tonnes-Al/$m^3$)=60.75 $m^3$. (The average space volume inside an average single family dwelling house is 241 $m^3$ for scale.) So, a single smelter of this size on a daily cycle could perform this task. However, there may be other reasons for dividing the task among multiple smelters.

As an example, a utility in accordance with the invention puts 720 MWh of electricity back to the grid. The amortized on-site PV electricity is expected to cost $10/MWh. Therefore, the onsite materials cost of producing is 720 MWh/day×$10/MWh=$7,200/day. The total business cost (labor+materials+profit) will be 3×$7,200=$21,600/day.

If the selling price of the daily 720 MWh output is $100/MWh ($0.10/kWh), the daily revenue will be $72,000. Therefore, the invention as described should be self-supporting.

Finally, although the description above contains much specificity, this should not be construed as limiting the scope of the invention, but as merely providing illustrations of some of the presently preferred embodiments of the invention. This invention may be altered and rearranged in numerous ways by one skilled in the art without departing from the coverage of any patent claims which are supported by this specification.

I claim:

1. A system that generates input intermittent electrical power and converts the intermittent electrical power into an inert energy storage element, wherein the system comprises an array of photovoltaic cells, operating from sun up to sun down for converting intermittent solar power into the intermittent electrical power, a smelter operating from the intermittent electrical power that converts an oxide of the energy storage element back into the energy storage element, a reactor that activates the energy storage element, the energy storage element when added to water produces hydrogen, heat and reaction by-products, and a gas turbine electricity generator that converts hot gases into output electrical power;

wherein the energy storage element is aluminum;

wherein the aluminum is dissolved in liquid gallium, the liquid gallium being an activation catalyst;

wherein a gallium synthesis liquid is provided in a form of the aluminum dissolved in the liquid gallium; and wherein a gallium source chamber is provided upstream of the reactor, the gallium source chamber containing the gallium synthesis liquid, including liquid aluminum and liquid gallium.

2. The system of claim 1, wherein the oxide of the energy storage element is gibbsite.

3. The system of claim 1, wherein electrodes of the smelter are carbon free.

4. The system of claim 1, wherein the reactor generates a total daily reaction by-products in cyclical sequential time segments during a 24-hour period.

5. The system of claim 1, wherein the smelter generates a total daily smelted energy storage element in cyclical sequential time segments during daytime.

6. The system of claim 1, wherein the heat of the reactor and heat from combusted hydrogen by-product is a source of hot gases needed to drive the gas turbine electricity generator.

7. The system of claim 1, further comprising an array of wind turbines for converting intermittent wind power into the input intermittent electrical power.

8. The system of claim 1, wherein the smelter is an Elysis smelter.

9. The system of claim 1 wherein said aluminum is substantially pure aluminum.

10. The system of claim 1 wherein the gallium synthesis liquid and water are brought into the reactor and hydrogen gas and gibbsite are discharged from the reactor.

* * * * *